United States Patent [19]
Hanback et al.

[11] 3,823,597
[45] July 16, 1974

[54] SWAGING TOOL DIE EXTENDER

[75] Inventors: Francis J. Hanback, Palos Verdes; Norman F. Robinson, Manhattan Beach, both of Calif.

[73] Assignee: McDonnell Douglas Corporation, Santa Monica, Calif.

[22] Filed: July 2, 1973

[21] Appl. No.: 375,694

[52] U.S. Cl. ................................. 72/402, 29/237
[51] Int. Cl. ........................................ B21d 37/00
[58] Field of Search ............ 72/402, 409, 410, 412, 72/415; 29/212 D, 237, 282

[56] References Cited
UNITED STATES PATENTS

| | | | |
|---|---|---|---|
| 2,202,125 | 5/1940 | Temple | 72/415 |
| 3,187,547 | 6/1965 | Ribback | 72/402 |
| 3,660,884 | 5/1972 | Kowal | 29/237 |
| 3,691,604 | 9/1972 | Spontelli | 29/237 |
| 3,745,633 | 7/1973 | Langweis | 72/402 |
| 3,771,343 | 11/1973 | Dawson | 29/237 |

*Primary Examiner*—Charles W. Lanham
*Assistant Examiner*—M. J. Keenan
*Attorney, Agent, or Firm*—Robert O. Richardson; Walter J. Jason; Donald L. Royer

[57] ABSTRACT

A horseshoe shaped swaging tool die extender adapted to fit onto an existing piston driven power system used for attaching fittings to fluid system pipes by external swaging. This die extender permits the swaging of fittings on closely spaced pipes.

6 Claims, 5 Drawing Figures

PATENTED JUL 16 1974 3,823,597
SHEET 1 OF 2
PRIOR ART
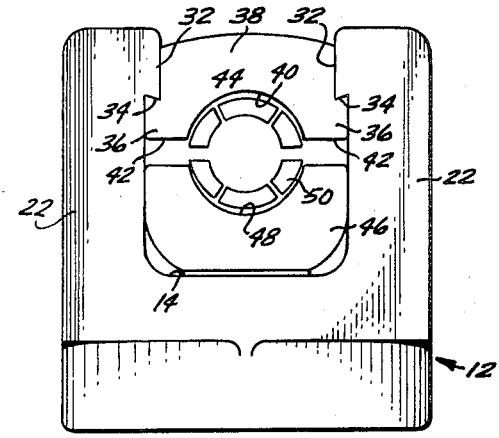
FIG. 1
PRIOR ART
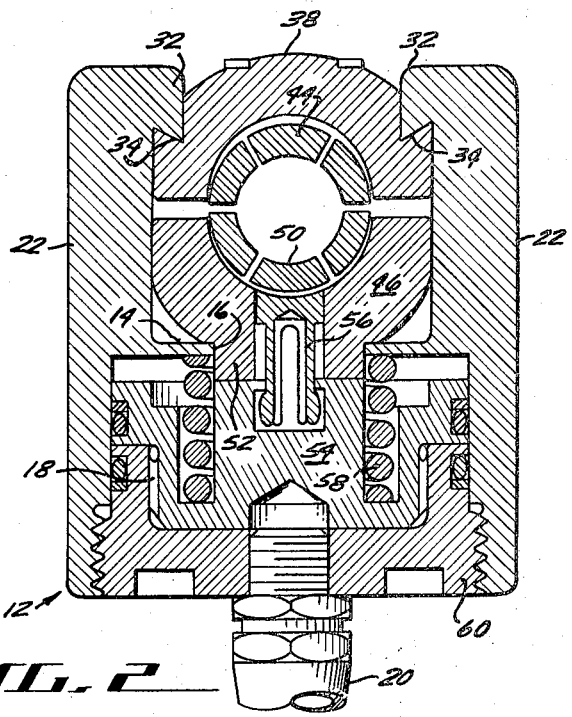
FIG. 2
PRIOR ART
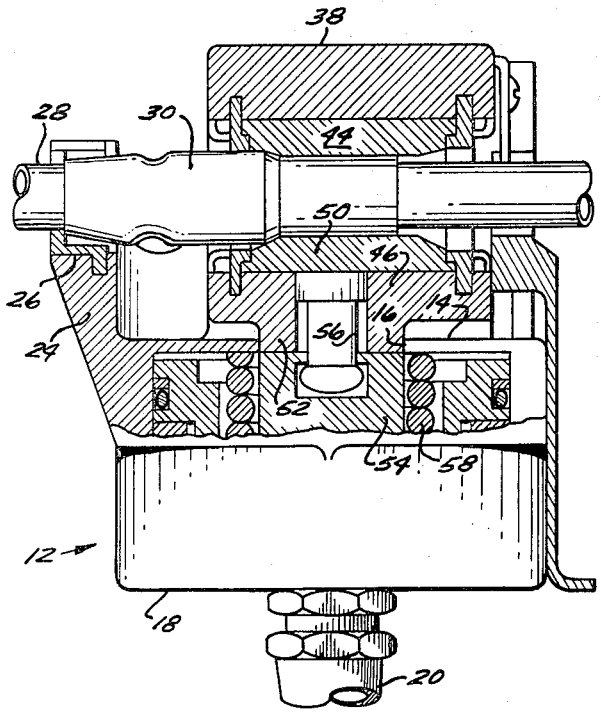
FIG. 3
FIG. 4

SWAGING TOOL DIE EXTENDER

RELATED INVENTIONS

The present tool was developed for the purpose of swage-joining of tubes in a high pressure hydraulic system or the like. One such fitting is disclosed in U.S. Pat. No. 3,675,949 issuing July 11, 1972 to James A. Dawson for Coupling Fitting for Connecting Two Parts. Swaging tools developed by James A. Dawson are shown in U.S. Pat. No. 3,726,122 issuing Apr. 10, 1973 and in application Ser. No. 237,990 filed Mar. 24, 1972, now U.S. Pat. No. 3,771,343.

BACKGROUND OF THE PRESENT INVENTION

The above-mentioned swage-joining of tubes have particular application in the building of aircraft. The manufacturing of precision and highly sophisticated products such as aircraft requires substantially perfect results because these vehicles cannot afford any failure or tolerances for errors. It is especially true that aircraft controls must work with certainty every time, and the transmission lines carrying pilot commands to the flight surfaces and other vital components must have the highest reliability and service life. With these high standards in mind, it is necessary to gain perfection in installing hydraulic transmission conduits through areas where space is tight and working room is at a premium.

Because of these demands, it will become evident that the usual threaded connections in high pressure fluid carrying lines can no longer be relied upon. A solution is found in replacing threaded conduit fittings with swaged fittings which are installed by performing the swaging operations in the final positions notwithstanding the lack of space to perform the swaging operation. Thus, the problem has been to obtain a swaging tool small enough to be manually operated in the small areas where conduit connections must be made.

The swaging tool hereinafter to be described is the answer to this need. This is a small and compact tool capable of being operated while held by hand and with the ability to exert force of the order required to swage a fitting and tube into a permanent connection with such assurance that failure is practically eliminated. In the swaging operation of the tool a pair of jaw members are required to engage the fitting and squeeze the fitting into the tube so that the two parts assume a unitary relationship without the generation of destructive heat or causing surface defects that can be the site of cracks and fatigue failures.

SUMMARY OF THE PRESENT INVENTION

Swaging tools now in use include swaging die elements normally loosely mounted when in open position for receiving the members to be joined. A force supplying means acts substantially simultaneously on the die elements to move them relative to each other and to members to be joined so as to circumferentially enclose and radially inwardly swage the members. The die elements are held by upper and lower die blocks that are squeezed together in the swaging operation. The squeezing occurs when the lower die block is piston powered upwardly toward the upper die block.

The improvement of the present invention involves the use of a horseshoe shaped elongated upper die element or die extender and an elongated piston for moving the lower die element upwardly further than the one now in use. This moves the "working area" of the tool outside the massive body section and permits swaging of tubes in very crowded areas. The upper die element is readily insertable around the tube and fitting to be swaged and has outwardly extending feet slidably engageable with inwardly extending projections on the main body of the tool.

When the feet are thus engaged, the upper die element holds the die and members to be swaged in inverted sling fashion against the swaging force of the piston and lower die element.

The upper and lower die elements are adapted to receive various configurations of dies to meet the needs of various sizes and shapes of tubes, fittings and their metallurgical composition.

BRIEF DESCRIPTION OF THE DRAWINGS

FIG. 1 is an end view of the prior art tool,

FIG. 2 is an elevational end view taken in section to show its operational features, FIG. 3 is an elevational side view, also taken in section, of the prior art tool, FIG. 4 is an end view of the tool of the present invention.

DETAILED DESCRIPTION OF ILLUSTRATIVE EMBODIMENT

Figure 5:
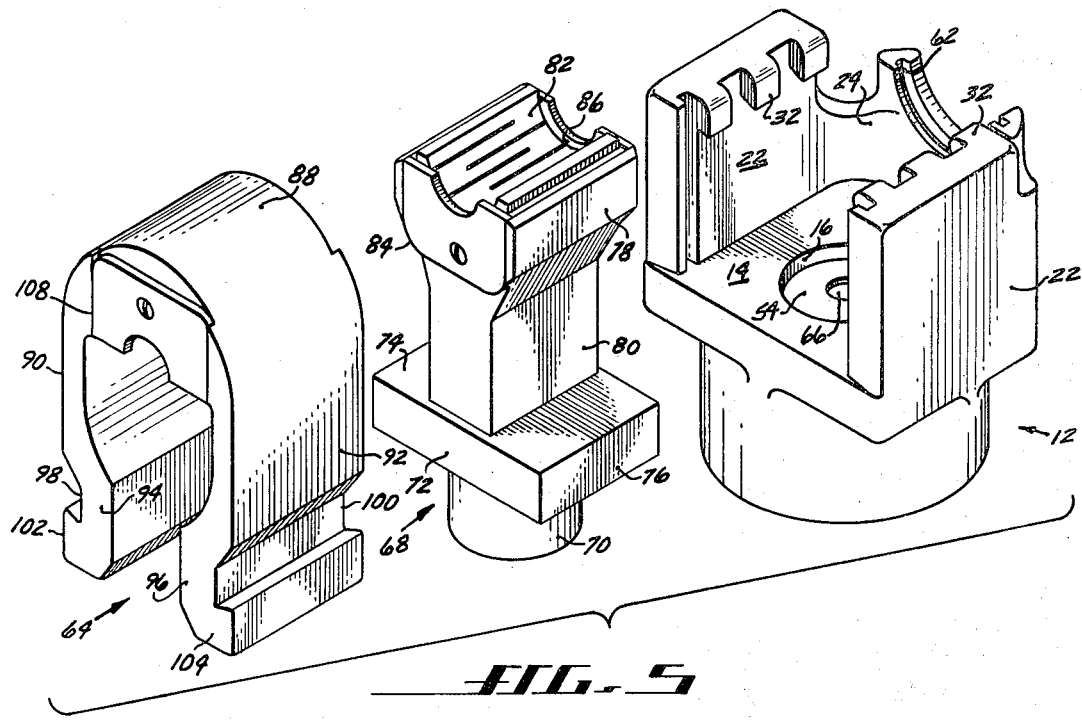
FIG. 5 is an exploded view taken in perspective to illustrate the simplicity of assembly.

Before describing the improvement comprising the present invention, the prior art swaging tool in FIGS. 1, 2 and 3 will first be explained. The tool comprises a body 12 having a bottom wall 14 apertured at 16 to open to a piston chamber 18 supplied with a pressure fluid through conduit 20. Body 12 has opposite side walls 22 and a connecting end wall 24 formed with a semi-circular socket 26 to bear against tube 28 and fitting 30. The upper margin of each side wall 22 is formed with spaced and inwardly projecting teeth 32, the bottom surfaces 34 of which are angularly undercut to receive the outwardly directed ears 36 on upper die block 38 which extends between side walls 22. Upper die block 38 has an arcuate cavity 40 along its undersurface 42 to receive an upper radially yieldable die segment 44.

A lower die block 46 has an arcuate cavity 48 into which may be positioned a lower radially yieldable die segment 50. The lower die block 46 extends at its lower end 52 through aperture 16 in bottom wall 14 of body 12 where it engages and is actuated by piston 54. Die block 46 is releasably fastened to piston 54 by a snap pin 56. Upon release of hydraulic pressure, a spring 58 urges piston 54 downwardly, opening the jaws or die blocks 38 and 46 to free them from around the tube and fitting swage connection. A closure cap 60 at the bottom of piston chamber 18 is threadedly connected and sealed to make the piston chamber fluid tight and also is threadedly connected to fluid conduit 20.

The foregoing description of a prior art swaging tool is brief but sufficient for one skilled in the art to understand, although a more thorough description may be had, if desired, with reference to the Dawson patents previously mentioned. Referring now to the improvement of the present invention shown in FIGS. 4 and 5, body 12 is the same power source as before. Side walls 22 have a connecting end wall 24 adapted to receive a semi-circular socket (not shown) in groove 62 to bear against the tube and fitting to be swaged. The upper margin of each side wall 22 is formed with spaced inwardly projecting teeth 32 to engage the die extender 64. Bottom wall 14 has a central aperture 16 through which can be seen the top of piston 54. Piston 54 has a central bore 66 into which a releasable pin (not shown) may be inserted to connect with the bottom of the lower die block assembly 68.

The lower die block assembly 68 consists of a lower post 70 which is adapted to bear against the top of piston 54 when assembled. A guide plate 72 with laterally extending arms 74 and 76 are adapted to move vertically between walls 22. Lower die block 78 on top of the upwardly extending support 80 completes the assembly 68. Removable die 82 is mounted in an annular recess on the top of die block 78 and retained by retainer plates 84 and 86.

Upper die extender 64 is horseshoe shaped, having an upper die holder portion 88 between elongated legs 90 and 92. These legs are adapted to fit on either side of lower die block 78 and extend downwardly and inwardly to terminate in ends 94 and 96. These ends have laterally extending cutout portions 98 and 100 adapted to slide between teeth 32 on body 12. Outwardly extending ears 102 and 104 on the ends 94 and 96 of extender 64 pass under teeth 32 to prevent upper die portion from moving upwardly during the swaging operation. The upper die 106 is removably mounted and retained in an annular recess in the under surface of die holder portion 88 by retainer plates 108.

The swaging tool is assembled by inserting the lower die block assembly 68 between walls 22 of body 12 with lower post 70 bearing on piston 54. Die 82 is then brought to bear against the tube and fitting to be swaged. The die extender 64 is then passed over the tube and fitting and slid into alignment over die 82. The laterally extending cutout portions pass between teeth 32 with ears 102 and 104 passing under them to prevent separation during swaging. After swaging, the die extender 64 is moved laterally to free ends 102 and 104 from teeth 32 of body 12 and then removed from around the swaged tube and fitting. The tool is then ready for the next swaging operation if the tube and fittings are similar to those just used. If not, new dies may be installed before using again.

Having thus described an illustrative embodiment, various modifications will occur to those skilled in the art and it is to be understood that these variations are to be construed as part of the present invention as claimed.

We claim:

1. A swaging tool comprising:
   a body having spaced side walls with inwardly directed teeth at the top thereof, and a bottom wall with an aperture therein, said body having a piston mounted below said aperture for vertical movement upon actuation thereof,
   a lower die block assembly having a lower post adapted to pass through said aperture and bear on said piston, an upwardly extending support with a lower die block on top thereof, said die block having a recess to receive a die therein,
   an upper die extender having an upper die holder portion with an undersurface adapted to receive a die, said extender having spaced elongated legs extending from said upper die holder portion and adapted to be passed over a tube and fitting to be swaged, said extender having means thereon engageable with said teeth on said body to prevent outward movement thereof upon vertical movement of said piston.

2. A swaging tool as set forth in claim 1 wherein said upper die holder portion is positioned above said teeth.

3. A swaging tool as set forth in claim 1 wherein said means are outwardly extending ears on said leg ends adapted to pass under said teeth.

4. A swaging tool as set forth in claim 1 wherein said elongated legs are adapted to fit on either side of said lower die block and wherein said legs extend downwardly and inwardly and terminate with ends having laterally extending cutout portions adapted to slide between said teeth on said body.

5. A swaging tool as set forth in claim 4 wherein said means comprise outwardly extending ears below said cutout portions adapted to pass under and engage with said teeth.

6. A swaging tool as set forth in claim 1 wherein said lower die block assembly has a guide plate with laterally extending arms extending between said side walls to guide said lower die block during vertical movement thereof.

* * * * *